United States Patent [19]

Christman et al.

[11] 3,948,763

[45] Apr. 6, 1976

[54] SULFIDING PROCESS FOR DESULFURIZATION CATALYSTS

[75] Inventors: Robert D. Christman; Kirk J. Metzger, both of Pittsburgh, Pa.

[73] Assignee: Gulf Research & Development Company, Pittsburgh, Pa.

[22] Filed: Mar. 25, 1974

[21] Appl. No.: 454,102

Related U.S. Application Data

[63] Continuation-in-part of Ser. No. 292,747, Sept. 27, 1972, abandoned.

[52] U.S. Cl............................ 208/216; 208/254 H
[51] Int. Cl.²........................................ C10G 23/02
[58] Field of Search ......... 208/216, 254 H; 252/439

[56] References Cited
UNITED STATES PATENTS

| | | | |
|---|---|---|---|
| 3,140,994 | 7/1964 | Derr et al. | 208/216 |
| 3,245,903 | 4/1966 | Champagnat | 208/216 |
| 3,277,199 | 10/1966 | Poll | 208/216 |
| 3,528,910 | 9/1970 | Haney et al. | 208/216 |

*Primary Examiner*—Delbert E. Gantz
*Assistant Examiner*—C. E. Spresser

[57] ABSTRACT

An improved method for sulfiding a petroleum distillate desulfurization catalyst which comprises sulfiding the catalyst composite with a sulfur-containing petroleum distillate at a temperature in excess of 660°F. and thereafter conducting the desulfurization process at a temperature less than 650°F.

4 Claims, No Drawings

SULFIDING PROCESS FOR DESULFURIZATION CATALYSTS

CROSS-REFERENCE TO RELATED APPLICATION

This application is a continuation-in-part of application Ser. No. 292,747, filed Sept. 27, 1972 now abandoned. The specification of the earlier filed application is incorporated herein by reference thereto.

BACKGROUND OF THE INVENTION

The hydrodesulfurization of petroleum hydrocarbons is well-known in the art. It is also known to use catalyst compositions in such hydrodesulfurization processes comprising a supported hydrogenating component which is at least one member of the group consisting of Group VI-B and Group VIII metals in a form capable of promoting hydrogenation reactions. Especially effective catalysts for the purpose of such hydrodesulfurization reactions are those comprising molybdenum and two members of the iron group metals. Preferred catalysts of this class are those containing nickel, cobalt and molybdenum but other combinations of iron group metals and molybdenum such as iron-molybdenum-cobalt, nickel-molybdenum-iron, as well as combinations of nickel and molybdenum, cobalt and molybdenum, nickel and tungsten or other Group VI-B or Group VIII metals taken singly or in combination. The hydrogenating or desulfurizing components of such catalysts are employed in the sulfided form.

Although the hydrogenating components indicated above may be employed in any proportions with each other, especially effective catalysts are those in which the hydrogenating components are those in the group consisting of oxides and sulfides comprising (a) a combination of 2 to 25%, preferably 4 – 16% by weight molybdenum and at least two iron group metals where the iron group metals are present in such proportions that the atomic ratio of each iron group metal in respect to molybdenum is less than about 0.4 and (b) a combination of about 5 to 40%, preferably 10 to 25% of nickel and tungsten where the atomic ratio of tungsten to nickel is about 1:0.1 to 5, preferably 1:0.3 to 4.

The hydrogenating components are composited with a porous alumina support. The alumina support is normally shaped in the form of granules, pellets or balls, prior to impregnation. The catalyst composite, however, can be in the form of a powder such as is employed for fluid type operations.

Conventionally, in the preparation of the prior art catalyst composites, the hydrogenation component such as molybdenum is deposited on the support from an aqueous solution of salts such as ammonium molybdate, ammonium paramolybdate, molybdenum pentachloride or molybdenum oxalate. After filtering and drying the impregnant is calcined to convert it into the oxide. The carrier is then treated with an aqueous solution of the iron group metal salt followed by calcining. If a second iron group metal is employed, the second iron group metal can be deposited in like manner. Nitrates or acetates of the iron group metals are normally utilized although any water soluble salt which leaves no harmful residue can be employed.

If desired, the iron group metals and molybdenum can be deposited simultaneously, but are preferably deposited in sequence with intervening calcining. Simultaneous impregnation of the iron group metals has been found to be satisfactory. Calcining of the catalyst composite has been conducted by heating in air to a temperature of 800° to 1600° F.

In sulfiding the catalyst composite, conventionally the catalyst is treated with hydrogen sulfide or hydrogen and hydrogen sulfide mixture. A second and a more preferred method of sulfiding the catalyst composite comprises contacting the catalyst at the beginning of an onstream period with the sulfur-containing petroleum distillate at the same conditions to be employed at the start of the desulfurization period. For example, if the desulfurization process is to be conducted initially at a temperature of 620° F., the catalyst composite would be sulfided by contact with the sulfur-containing petroleum distillate at a temperature of 620° F.

A disadvantage of employing the petroleum distillate feed in sulfiding the catalyst composite in the conventional manner is that initially the desulfurization activity of the catalyst composite is low. For example, where a desulfurization catalyst composite is employed for light petroleum distillate desulfurization it has been observed that only 65% of the sulfur is removed from the feed after two days of operation under hydrodesulfurization conditions at a temperature of 620° F. When operating the desulfurization process at a temperature of 620° F., equilibrium conditions where at least 70% of the sulfur is removed are not reached until a period of at least 10 days has lapsed.

Accordingly, an object of the invention is to provide an improved process for sulfiding a hydrodesulfurization catalyst.

Another object of the invention is to provide an improved process for sulfiding a hydrodesulfurization catalyst composite employing the sulfur-containing petroleum distillate feed in the sulfiding process.

Yet another object of the invention is to provide an improved hydrodesulfurization process operating at a temperature below 650°F.

Other objects, advantages, and features of this invention will be readily apparent to those skilled in the art from the following description and appended claims.

SUMMARY OF THE INVENTION

An improved process for sulfiding a distillate desulfurization catalyst and an improved desulfurization process are obtained by initially contacting a sulfur-containing petroleum distillate feed with a catalyst composite comprising a hydrogenating component deposited on an alumina support under hydrodesulfurization conditions at a temperature of at least 660°F. and after sulfiding of the catalyst composite is complete, the desulfurization process is thereafter conducted at a temperature below 650°F.

DESCRIPTION OF THE INVENTION

The invention is applicable to the desulfurization of petroleum distillates. As employed in the description of this invention the term "petroleum distillates" refers to those crude oil fractions which have a 90% distillation condensation point of less than 700°F., have a concentration in the range of 0.2 to 2.0 weight percent sulfur, are conventionally desulfurized at a temperature below 650°F., and which contain less than 1.0 weight percent asphaltenes. The invention is particularly applicable to desulfurization of those crude oil fractions conventionally known as naphtha, kerosene, and light distillate fractions having 90% points less than 625°F. which contain a sulfur concentration in the range of 0.5 to 1.5 weight percent and which are employed in the preparation of diesel fuels, furnace oils and the like.

In preparing the desulfurization catalyst composites of this invention, at least one hydrogenating metal component selected from Group VI-B and Group VIII metals is employed. The metal is admixed with an alumina support which can contain minor concentrations, not exceeding about 0.2% of impurities such as silica and iron. Although not to be limited thereto, the normal particle diameter of the alumina support material employed in forming the catalyst composite falls within the range of 1/8 to 1/16 inch.

Various methods known in the art can be employed in preparing the catalyst composite. One method comprises impregnating extruded alumina pellets with an aluminum monomolybdate solution so as to obtain a catalyst composite containing from 5.0 to 15.0 weight percent of molybdenum. The impregnated alumina can then be dried at an elevated temperature of 250°F.

If additional metals are to be employed in preparation of the hydrogenation catalyst the alumina support impregnated with the molybdenum can thereafter be contacted with an aqueous solution of the metal salt. In preparation of a nickel-cobalt-molybdenum-on-alumina catalyst composite the alumina impregnated with molybdenum can be contacted with an aqueous solution of nickel nitrate and cobalt nitrate. Preferably, in the preparation of such catalysts, sufficient nickel nitrate and cobalt nitrate are admixed with the alumina support so as to provide a catalyst composite containing from 0.1 to 5 weight percent nickel and from 0.1 to 5 weight percent cobalt. The wet catalyst composite can then be dried in a second drying stage operated similarly to the initial drying stage described above.

Following the drying stage, the catalyst composite can then be calcined at a temperature in the range of 800° to 1600° F. for a period of 1 to 24 hours, optionally followed by a reduction step. Although a two-step impregnation catalyst preparation procedure has been described it is obvious to one skilled in the art that a single impregnation step where more than one metal is employed in preparation of the catalyst composite can be utilized.

The novel desulfurization process comprises sulfiding the prepared catalyst composite with the sulfur-containing petroleum distillate feed at a temperature substantially above the normal desulfurization temperature. By contacting the catalyst composite with the sulfur-containing petroleum distillate feed at an elevated temperature of at least 660° F., preferably at a temperature of about 675° F., the maximum desulfurization activity of the catalyst composite is normally obtained within a time of 4 hours. As previously indicated, with conventional sulfiding of the metal composite under hydrodesulfurization conditions employing a desulfurization temperaure below 650° F., the maximum desulfurization activity is not normally obtained until after 8 days of operation.

To maximize the desulfurization activity of the catalyst composite the sulfiding step conducted at the beginning of the desulfurization run is performed for a period ranging from 4 to 48 hours. The sulfiding step is conducted in the presence of uncombined hydrogen partial pressures in the range of 200 to 4000 psig. The hydrogen gas employed during the sulfiding step and the subsequent hydrogen desulfurization step is circulated through the reactor at a rate between about 700 and 3000 standard cubic feet (SCF) per barrel of feed.

The hydrogen purity may vary from about 60 to 100%. If the hydrogen is recycled, it may be necessary to provide for bleeding of a portion of the recycled gas and to make up hydrogen in order to maintain the hydrogen purity within the range specified. If desired, the recycled hydrogen gas can be washed with a chemical absorbent for hydrogen sulfide or otherwise treated in a conventional manner to reduce the hydrogen sulfide content prior to recycling.

The sulfiding step can be conducted in the liquid or vapor phase and at a liquid hourly space velocity in the range of 0.25 to 10. Reaction zone pressures in the range of 200 to 5000 lbs. per square inch gauge (psig), normally in the range of 500 to 2000 psig, are maintained in the sulfiding zone.

Following the completion of the sulfiding step, the temperature is lowered to the normal desulfurization temperature below 650° F. and the desulfurization process continued. With the exception of the desulfurization temperature, all other process parameters can be as described in connection with the sulfiding step. When employing a light distillate having a 90% point of less than 625° F. as the feed, the temperature is normally lowered initially to a temperature in the range of 550° to 640° F. and the hydrodesulfurization process continued. The sulfiding and hydrodesulfurization steps described above can be conducted in a continuous manner.

The following examples are presented to illustrate objects and advantages of the invention. It is not intended, however, to limit the invention to the specific embodiments presented therein.

EXAMPLE 1

In this example the effectiveness of the novel sulfiding step to maximize the desulfurization of a petroleum distillate is demonstrated. The petroleum distillate in this example contained 0.97 weight percent sulfur and was further characterized as follows:

| | |
|---|---|
| Gravity: °API | 34.0 |
| Aniline Point: °F. | 153 |
| Distillation, ASTM: °F. | |
| 10% | 490 |
| 50% | 555 |
| 90% | 600 |

The catalyst employed in this run comprised 2.25 weight percent nickel, 1.25 weight percent cobalt, and 11 weight percent molybdenum on alumina.

In the sulfiding step, the catalyst composite was continuously contacted with the petroleum distillate feed at a temperature of 660° F. The pressure in the sulfiding zone was 600 psig. 1000 standard cubic feet per barrel of 85 percent purity hydrogen was continuously passed to the sulfiding zone. A petroleum distillate feed liquid weight hourly space velocity of 4.0 was maintained throughout the sulfiding step.

After completion of a 12 hour sulfiding step, the temperature was lowered to 620° F. and the hydrodesulfurization process continued. 73 – 74 percent of the sulfur was continuously separated from the petroleum distillate feed during a hydrodesulfurization run of 8 days. Identical results were observed when the catalyst sulfiding step was carried out at 700° F.

EXAMPLE 2

In this example the sulfiding step of Example 1 was repeated, employing the same petroleum distillate feed and the same catalyst composite. Identical hydrodesulfurization conditions were maintained during the sulfiding step with exception that the sulfiding zone temperature was maintained at 620° F.

After two days of conducting the desulfurization step operation, 66.5 percent of the sulfur was being removed from the petroleum distillate feed. After 4 days of operation, 68.5 percent of the sulfur was being removed from the petroleum distillate feed and it was not until the tenth day of operation that 73 percent of the sulfur was being separated from the petroleum distillate feed.

A comparison of the results obtained in this example and Example 1 demonstrates the effectiveness of the invention to substantially reduce the time required to obtain maximum desulfurization activity of a catalyst composite by conducting the sulfiding step of the desulfurization process at a temperature of at least 660° F.

EXAMPLE 3

In this example a catalyst composed of 3 percent cobalt — 11 percent molybdenum on alumina was sulfided for 12 hours at 620° F., 600 psig and 5.85 space velocity with 900 SCF/B of 85 percent hydrogen.

The desulfurization operation was continued at the same conditions for 12 hours after the sulfiding period employing the same feed of Examples 1 and 2. During this second 12 hour period at 620° F., 58 percent of the sulfur was removed from the feed.

The temperature was then increased to 660° F. for 24 hours, then to 700° F. for another 24 hours, and then returned to 620° F. After 12 hours to establish equilibrium, the product was collected for an additional 12 hours. 64.6 percent of the sulfur had been removed.

Although the invention has been described with reference to specific embodiments, references, and details, various modifications and changes will be apparent to one skilled in the art and are contemplated to be embraced in this invention.

We claim:

1. In a process which comprises hydrodesulfurizing a petroleum distillate feed containing from 0.2 to 2.0 weight percent sulfur and having a 90% distillation condensation point of less than 625°F. at a temperature in the range of 550° to 640°F. and in the presence of a catalyst comprising from 0.1 to 5 weight percent cobalt, from 0.1 to 5 weight percent nickel, from 5.0 to 15 weight percent molybdenum, and alumina; the improvement which consists essentially of initially contacting said catalyst with said sulfur-containing petroleum distillate feed under sulfiding conditions of at least 660°F. for a period in the range of 4 to 48 hours, and thereafter contacting said catalyst with said feed under hydrodesulfurization conditions at a temperature in the range of 550° to 640°F.

2. The process of claim 1 wherein the 10% distillation condensation point of said petroleum distillate feed is above 400°F.

3. The process of claim 1 wherein said distillate feed is kerosene and the concentration of sulfur in said kerosene is in the range of 0.5 to 1.5 weight percent.

4. The process of claim 1 wherein said catalyst comprises from 0.1 to 5 weight percent cobalt, from 0.1 to 5 weight percent nickel, from 5.0 to 15 weight percent molybdenum, and alumina.

* * * * *

UNITED STATES PATENT AND TRADEMARK OFFICE
CERTIFICATE OF CORRECTION

PATENT NO. : 3,948,763
DATED : April 6, 1976
INVENTOR(S) : Robert D. Christman and Kirk J. Metzger It is certified that error appears in the above-identified patent and that said Letters Patent are hereby corrected as shown below:

Col. 6, line 31, delete "4. The process of claim 1 wherein said catalyst comprises from 0.1 to 5 weight percent cobalt, from 0.1 to 5 weight percent nickel, from 5.0 to 15 weight percent molybdenum, and alumina."

Signed and Sealed this

Seventh Day of September 1976

[SEAL]

Attest:

RUTH C. MASON
*Attesting Officer*

C. MARSHALL DANN
*Commissioner of Patents and Trademarks*